United States Patent
Vu (10) Patent No.: US 6,814,172 B1
(45) Date of Patent: Nov. 9, 2004

(54) ELECTRIC POWER UNIT FOR TWO-WHEEL VEHICLES

(76) Inventor: Oanh Ngoc Vu, 323 East King Edward Avenue, Vancouver, British Columbia (CA), V5V 2C4

(*) Notice: Subject to any disclaimer, the term of this patent is extended or adjusted under 35 U.S.C. 154(b) by 0 days.

(21) Appl. No.: 10/623,853

(22) Filed: Jul. 21, 2003

(51) Int. Cl.$^7$ .............................................. B60R 16/04
(52) U.S. Cl. ......................... 180/220; 429/62; 180/65.1
(58) Field of Search ............................... 180/220, 65.8, 180/65.1, 181, 219; 429/62, 99, 100, 120, 148

(56) References Cited

U.S. PATENT DOCUMENTS

| | | | |
|---|---|---|---|
| 5,513,721 A | * 5/1996 | Ogawa et al. | 180/220 |
| 5,558,949 A | * 9/1996 | Iwatsuki et al. | 429/99 |
| 5,585,204 A | * 12/1996 | Oshida et al. | 429/62 |
| 5,624,003 A | * 4/1997 | Matsuki et al. | 180/65.1 |
| 5,639,571 A | * 6/1997 | Waters et al. | 429/71 |
| 5,730,237 A | * 3/1998 | Matsuki et al. | 180/65.1 |
| 5,765,671 A | 6/1998 | Endo et al. | |
| 5,824,432 A | * 10/1998 | Currle | 429/120 |
| 5,853,058 A | * 12/1998 | Endo et al. | 180/65.1 |
| 5,879,833 A | * 3/1999 | Yoshii et al. | 429/62 |
| 6,176,338 B1 | * 1/2001 | Nakagawa et al. | 180/219 |
| 6,196,347 B1 | 3/2001 | Chao et al. | |
| 6,259,229 B1 | 7/2001 | Ashtiani et al. | |
| 6,372,378 B1 | * 4/2002 | Warner et al. | 429/120 |
| 6,569,556 B2 | * 5/2003 | Zhou et al. | 429/88 |
| 6,596,433 B2 | * 7/2003 | Gudmundsson et al. | 429/62 |
| 2002/0035427 A1 | 3/2002 | Lee et al. | |

\* cited by examiner

*Primary Examiner*—Lesley D. Morris
*Assistant Examiner*—Tony Winner
(74) *Attorney, Agent, or Firm*—Frederick Kaufman (57) ABSTRACT

An electric power unit for two-wheel vehicles comprising a batteries housing, from which current is supplied to a DC magnetic motor that is connected to a controller assembly, and a chain transmission driven by the DC magnetic motor, which is adapted to actuate a driven wheel of a two-wheel vehicle. The latter has a frame to which the electrical power unit for two-wheel vehicles is attached. The batteries housing incorporates a structure having two outwardly open compartments between which a hollow zone is interposed. Each of the two outwardly open compartments is divided in several partitions. Each of the several partitions is adaptable to receive one of several rechargeable batteries that are provided with terminals for contacting a wiring. Each of the two outwardly open compartments is provided with air channels air for heating the several rechargeable batteries. The DC magnetic motor with speed control comprises a stator including several alternating, equally spaced, permanent magnets that form a pair of parallel, concentric discs, a rotor including a central armature in a disc form, with two-loop windings and an even number of commuter segments. The commuter segments with odd ordinal numbers form first loop windings. The commuter segments with even ordinal numbers form second loop windings. Several brushes are disposed in a conventional holder that is concentrically affixed to the rotor. Half of the several brushes are used for starting the DC magnetic motor, while another half are used for regular functioning.

2 Claims, 10 Drawing Sheets

ELECTRIC POWER UNIT FOR TWO-WHEEL VEHICLES

I. BACKGROUND OF THE INVENTION

1. Field of the Invention

The present invention relates in general to electrical powered vehicles and, more particularly, to an electrical power unit for two-wheel vehicles.

2. Description of the Prior Art

Two-wheel vehicles of the type using a gasoline engine as a drive source are mainly available at present. However, two-wheel vehicles of the type using an electric motor as a drive source are required in large urban areas and on a lot of traffic highways where the exhaust gases are predominant. Thus, in view of environmental protection and also in view of resources conservation, the trend in two-wheel vehicles development is to design power units actuated by electricity in place of existing two-wheel vehicles that use gasoline.

A main shortcoming encountered in the development of electric driven two-wheel vehicles resides in the requirement of large consumption of electricity at start. Rotary electric machines with flat stator armature oil and two rotors having magnets disposed in opposite relationship to the coil are known. The main disadvantage of these rotary electric machines resides in the fact that they use a one-loop winding that provide a starting low torque.

Common batteries with aqueous or nonaqueous electrolytes perform poorly in environments colder than their lowest operational temperatures, because the electrolytes freeze and/or become viscous with consequent degradation of ion-transport properties. Furthermore, for example, when an engine starts, the battery must produce high voltage energy and this becomes critical in cold weather when the resistance in the battery increases and the voltage is lower.

Conventional battery heating systems typically use a separate power source to supply energy to a heating element that generates the required heat. The resultant heat is then transferred to the battery by either a convection system or a conduction system. Convection systems blow hot air across the battery, whereas conduction systems apply heat directly to the surface of the battery. Warm air heating requires complex mechanical systems that use substantial amount of external power. This constraint limits the portability of batteries and demands the availability of an external separate power source for heating the battery.

Systems employing thermal jackets usually include flexible insulators that wrap around of batteries. The thermal jackets must also be powered by separate power sources and require substantial amounts of energy.

There are very many patents related to two-wheel electrical vehicles. The inventor believes that those patents taken alone or in combination neither anticipate nor render obvious the present invention.

II. SUMMARY OF THE INVENTION

There is accordingly a need for an electric power unit for two-wheel vehicles that overcomes the disadvantages of the known types of electric two-wheel vehicles.

It is therefore an objective of the present invention to provide an electric power unit for two-wheel vehicles with a heated batteries housing for enhancing the voltage at low temperatures, at start.

It is a further objective of the present invention to provide rotary electrical motors with high torques at start, when inertia forces must be surmounted.

It is yet another objective of the present invention to provide a reliable system for controlling the speed of a two-wheel vehicle.

Accordingly, the present invention is directed to an electric power unit for two-wheel vehicles comprising a batteries housing from which current is supplied to a DC magnetic motor that is connected to a controller assembly, and a chain transmission driven by the DC magnetic motor adapted to actuate a driven wheel of a two-wheel vehicle. The latter has a frame to which the electrical power unit for two-wheel vehicles is attached.

The batteries housing incorporates a structure having two outwardly open compartments between which a hollow zone is interposed. Each of the two outwardly open compartments is divided in several partitions. Each of the several partitions is adaptable to receive one of several rechargeable batteries that is provided with terminals for contacting a wiring. Each of the two outwardly open compartments is provided with air channels for heating the several rechargeable batteries. The air channels for heating the several rechargeable batteries are located in the two outwardly open compartments, in and adjacent their walls, as follows: a) in a top and bottom walls and in a pair of second lateral walls, and open towards the several partitions, and b) adjacent a first lateral wall, for forming upper and lower passages.

The DC magnetic motor with speed control comprises a stator including several alternating, equally spaced, permanent magnets, which form a pair of parallel, concentric discs and a rotor including a central armature in a disc form, with two-loop windings and an even number of commuter segments. The commuter segments with odd ordinal numbers form first loop windings. The commuter segments with even ordinal numbers form second loop windings. Several brushes are disposed in a conventional holder that is concentrically affixed to the rotor. Half of the several brushes are used for starting the DC magnetic motor, while another half are used for regular functioning.

The controller assembly incorporates a Central Processing Unit and a Pulse Width Modulator Motor Speed Controller.

III. BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming part hereof, wherein like reference numerals refer to like parts through the several views in which:

IV. DESCRIPTION OF THE PREFERRED EMBODIMENT

Figure 1:
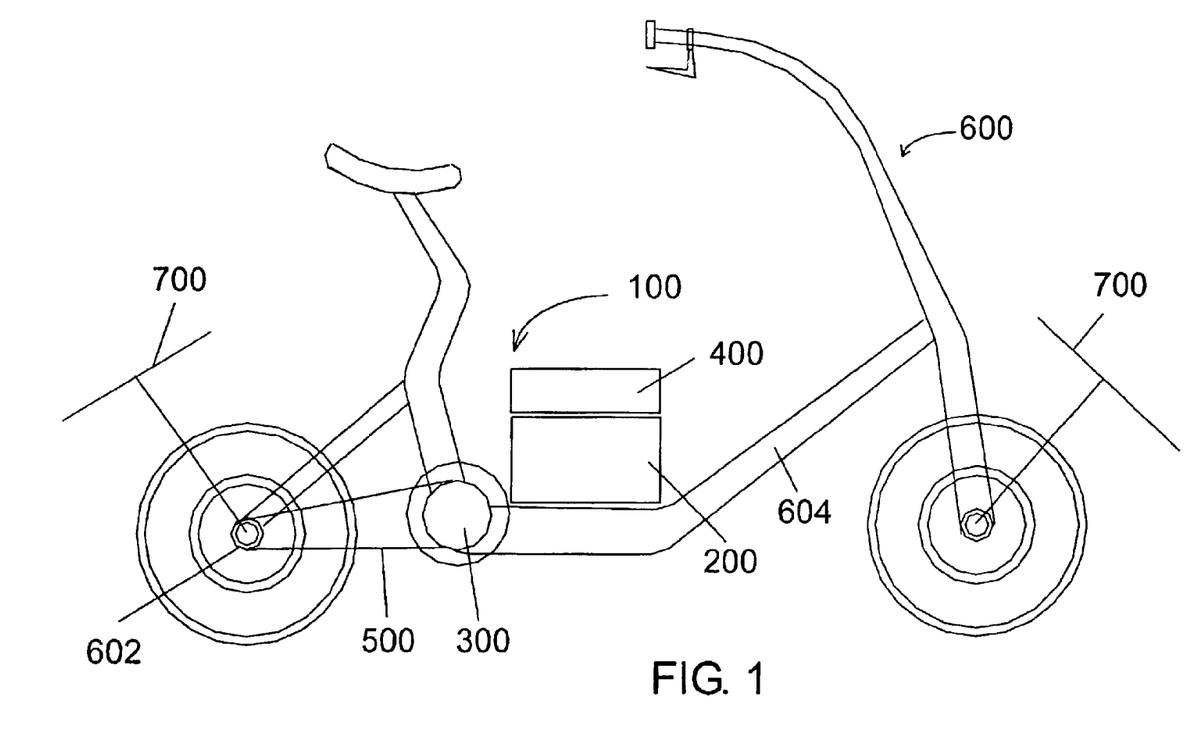
FIG. 1 is a general schematic view of a motorcycle on which an electric power unit for two-wheel vehicles is mounted.
Figure 2:
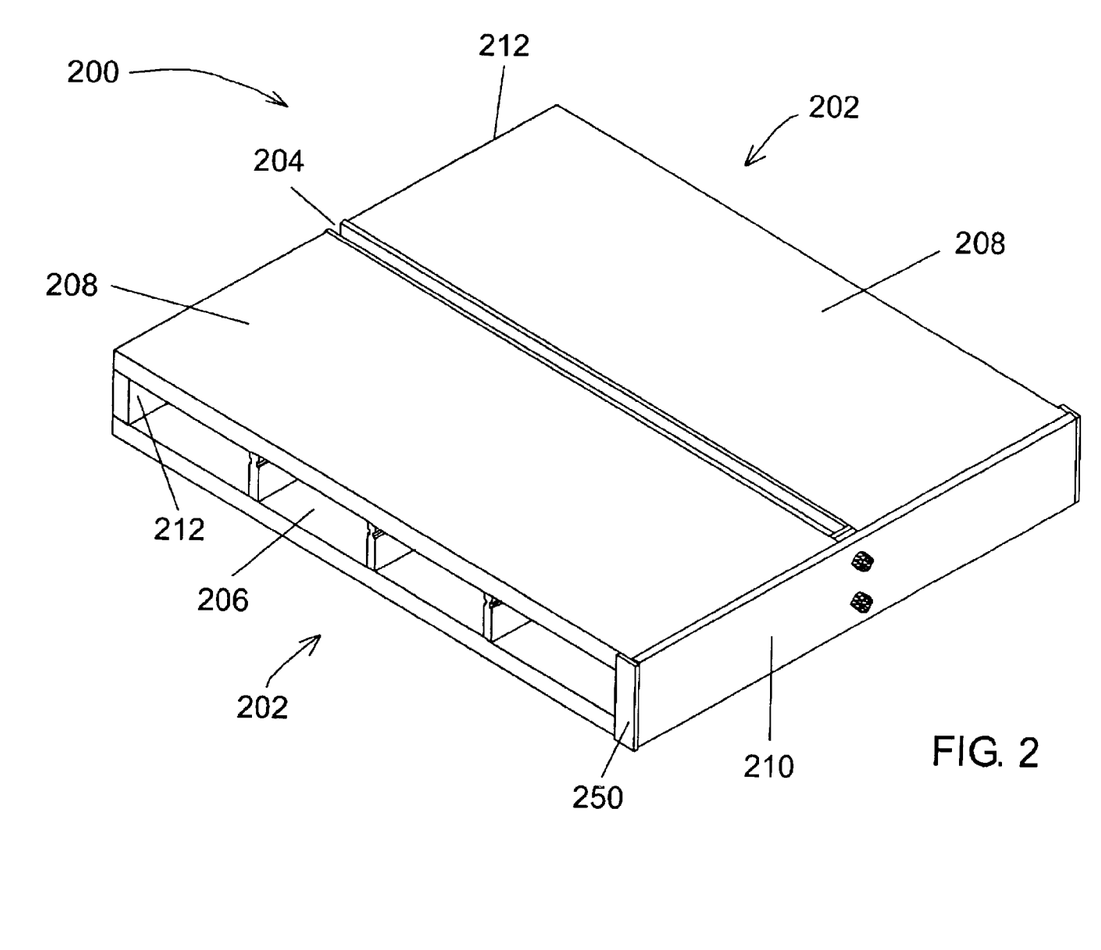
FIG. 2 is a perspective view of a batteries housing according to the embodiment of the present invention.
Figure 3:
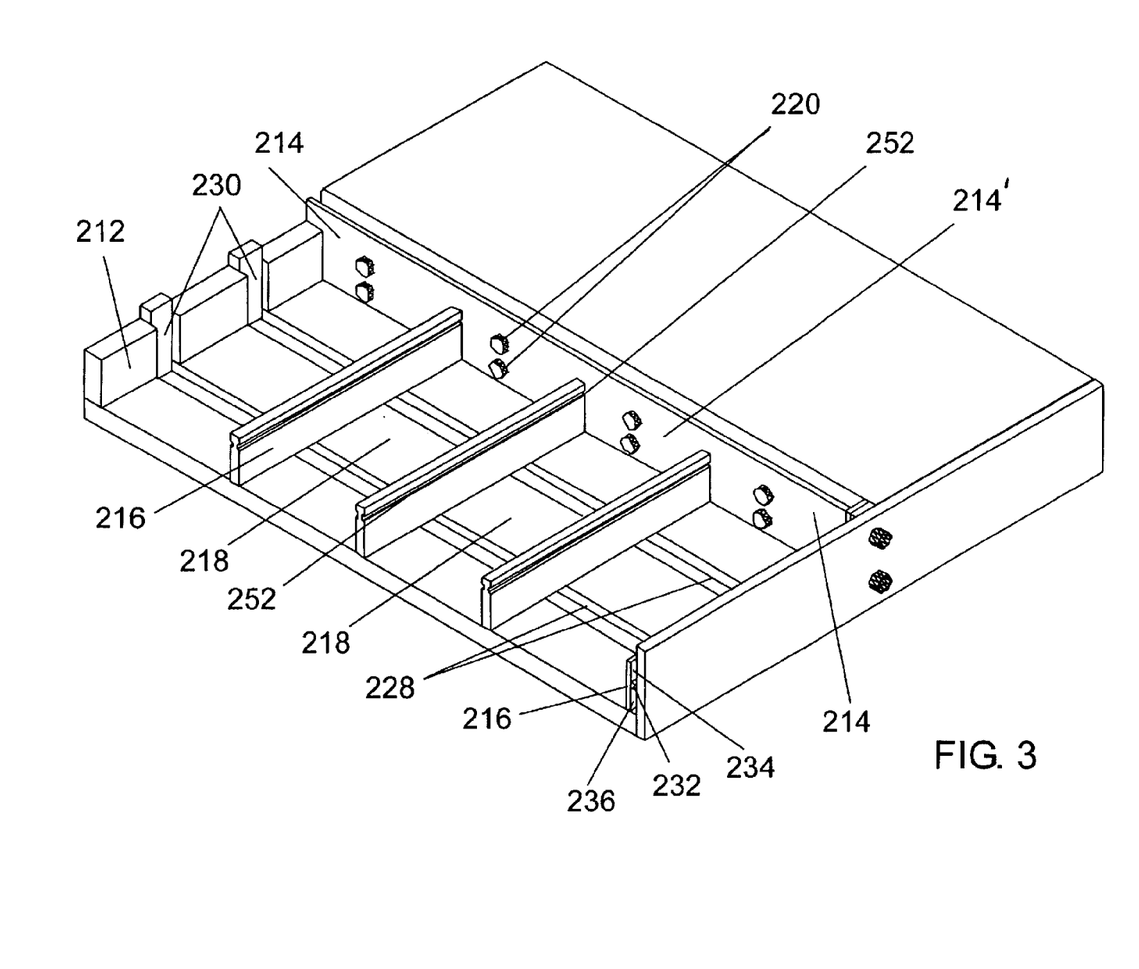
FIG. 3 is a perspective view of the batteries housing of FIG. 2, depicted without one of the top walls.
Figure 4:
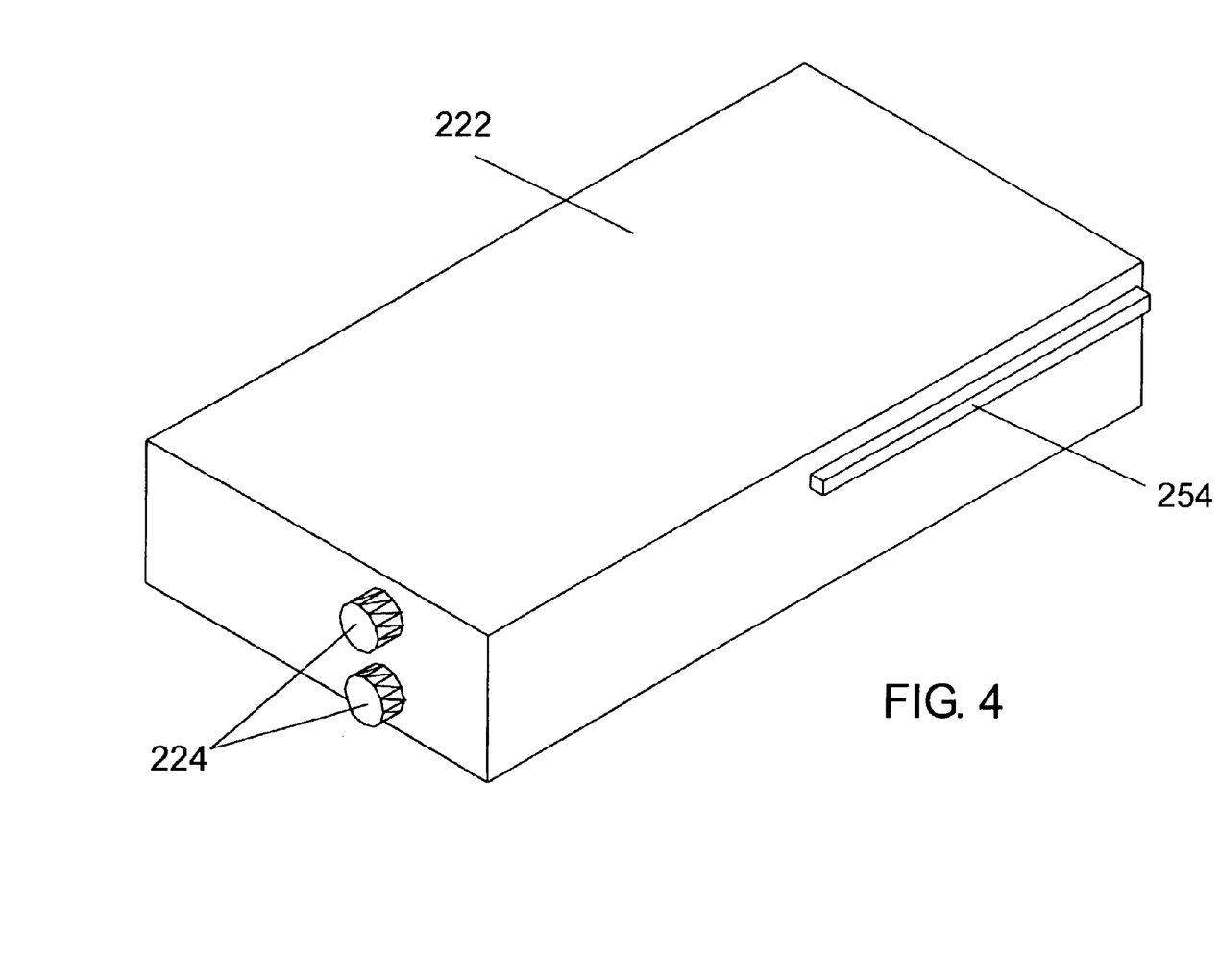
FIG. 4 is a perspective view of one of the rechargeable batteries used in the embodiment of the present invention.
Figure 5:
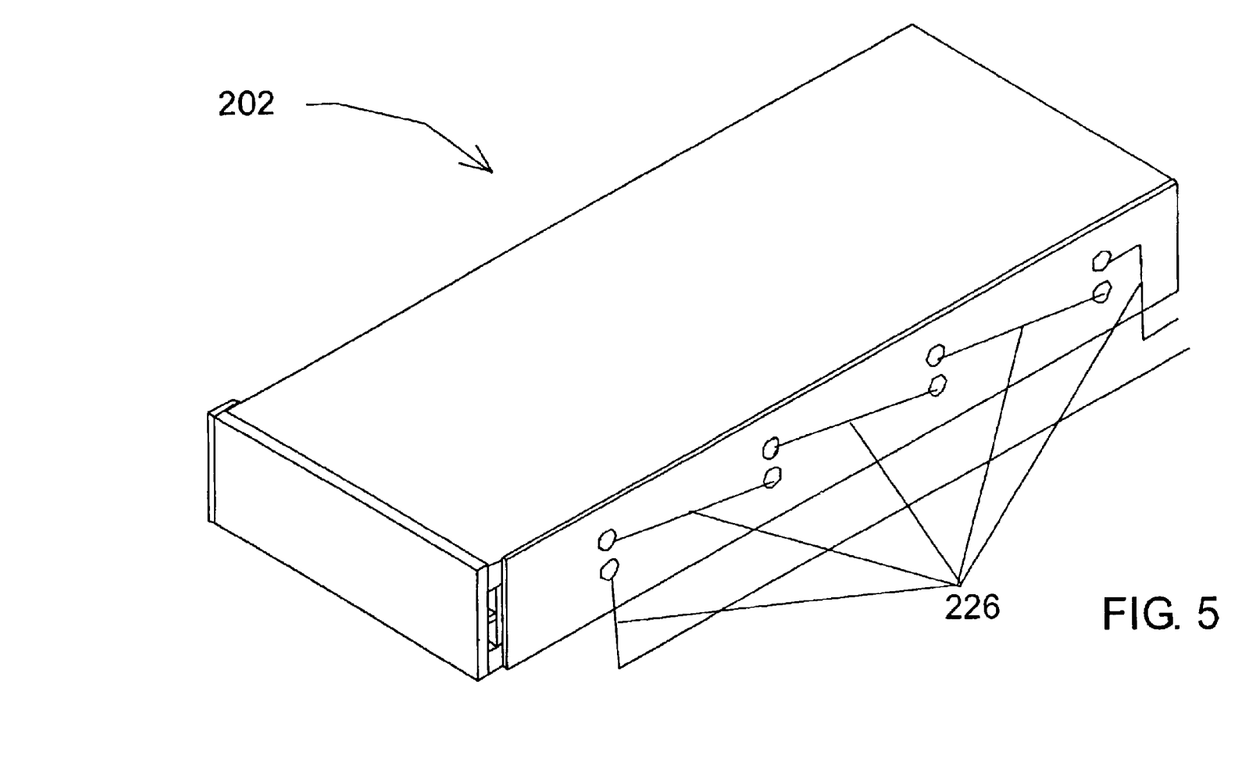
FIG. 5 is a perspective view of one of the two outwardly open compartments of the batteries housing depicting a wiring.
Figure 6:
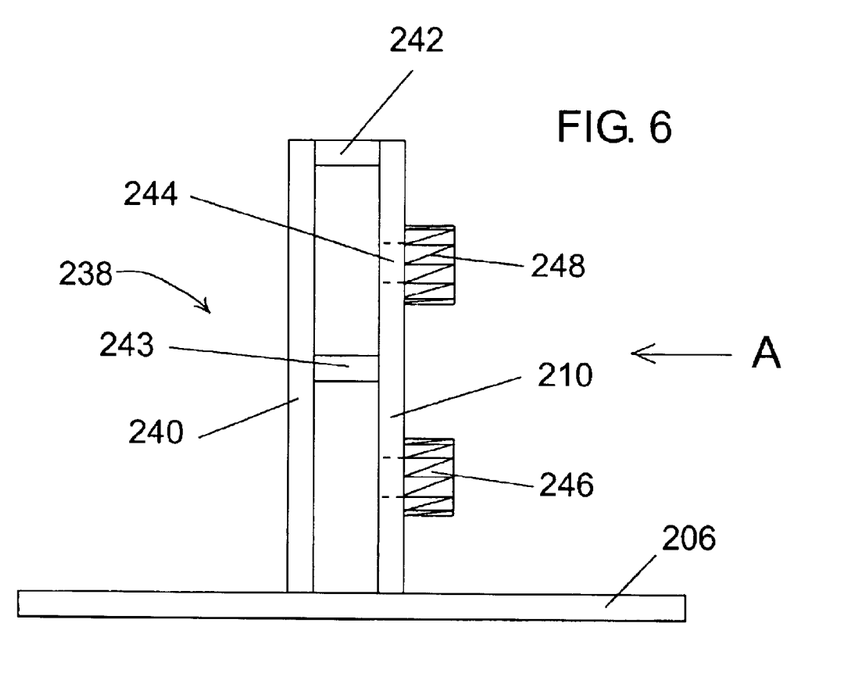
FIG. 6 is a side view of an enclosure located in a hollow zone between the two outwardly open compartments.
Figure 7:
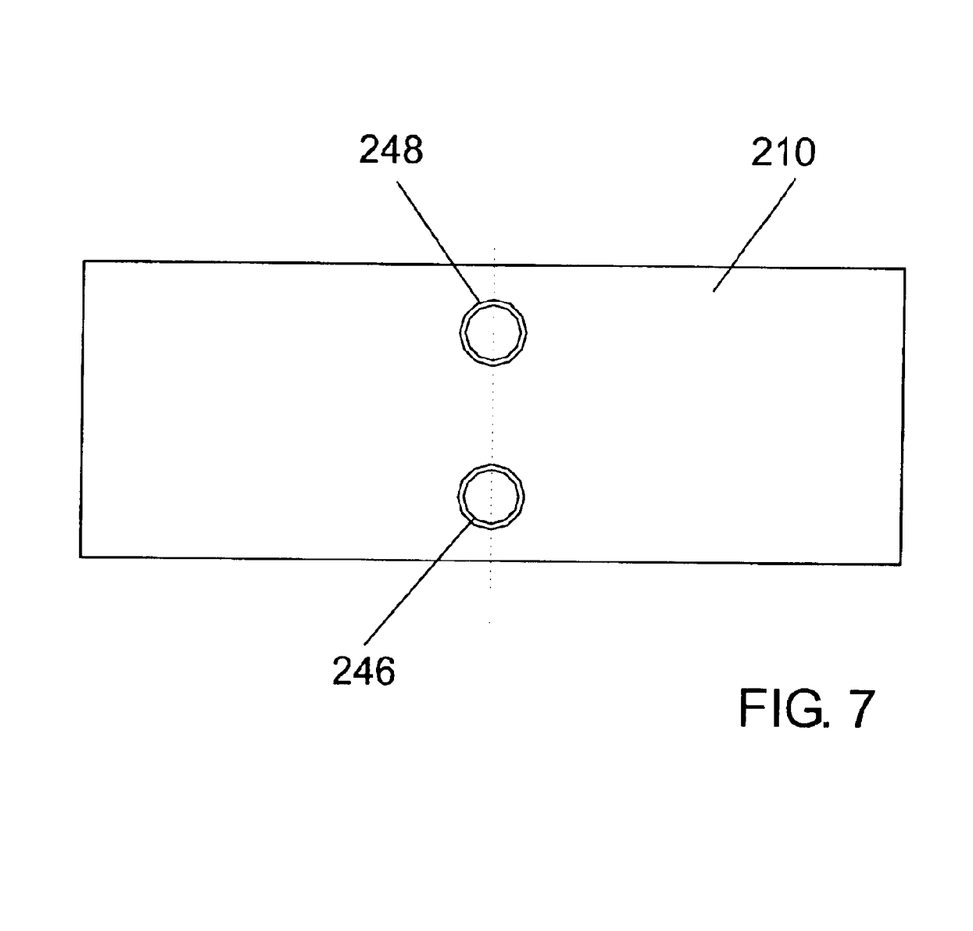
FIG. 7 is a view of FIG. 6 as viewed from arrow A.

Referring now to FIG. 1, an electrical power unit for two-wheel vehicles 100 comprises batteries housing 200 from which current is supplied to a DC magnetic motor 300. The latter is connected to a controller assembly 400. A chain transmission 500 is mounted between DC magnetic motor 300 and a motorcycle 600, respectively, a driven wheel 602 of the latter. Motorcycle 600 has a frame 604 to which all the foregoing components of electrical power unit for two-wheel vehicles 100 are attached. A pair of solar panels 700 is fastened to frame 604, in front and back of motorcycle 600.

Referring now to FIGS. 2 to 8, batteries housing 200 constitutes a unitary structure generally comprising two outwardly open compartments 202, between which a hollow zone 204 is interposed. Each outwardly open compartment 202 represents a mirror image of the other outwardly open compartment 202. Referring now in detail, batteries housing 200 comprises:

- a bottom wall 206 extending across two outwardly open compartments 202 and hollow zone 204;
- a pair of top walls 208, each top wall 208 extending across one outwardly open compartment 202;
- a first lateral wall 210, perpendicularly disposed to bottom and top walls 206 and 208 and extending along two outwardly open compartments 202 and hollow zone 204;
- a pair of second lateral walls 212, perpendicularly disposed to bottom and top walls 206 and 208, each second lateral wall 212 extending along an outwardly open compartment 202;
- a pair of back walls 214 disposed perpendicular to bottom wall 206 and used for closing each outwardly open compartment 202 and for forming, together with portions of bottom and first lateral walls 206 and 210 respectively, hollow zone 204;
- several separating, equally spaced walls 216, extending across each outwardly open compartment 202 and disposed parallel to first lateral wall 210; thus, each outwardly open compartment 202 is divided in several partitions 218; each one of several partitions 218 having a rear wall 214' that constitutes a portion of back wall 214; on each rear wall 214', which faces each of several partitions 218, a pair of (+) and (−) contacts 220 is located; the pair of (+) and (−) contacts 220 (usually springs) is adaptable to contact a rechargeable battery 222, respectively its terminals 224; a wiring 226, connecting all pairs of (+) and (−) contacts 220 of several partitions 218, is disposed on each back wall 214, towards hollow zone 204; the size of each rechargeable battery 222 is relatively lesser than that of a regular motorcycle battery; therefore, several partitions 218 are used in each outwardly open compartment 202;
- bottom wall 206 is provided with two first parallel channels 228 open towards the interior of each outwardly open compartment 202 and located between first and second lateral walls 210 and 212;
- each of the pair of top walls 208 is also provided with two first parallel channels 228 (not shown) open towards the interior of each outwardly open compartment 202 and located between first and second lateral walls 210 and 212, opposite to the two first parallel channels 228 provided in bottom wall 206;
- each of the pair of second lateral walls 212 is provided with two-second parallel channels 230 open towards the interior of each outwardly open compartment 202, between bottom and top walls 206 and 208;
- in each outwardly open compartment 202, proximate to first lateral wall 210, one of the several separating, equally spaced walls 216 is located; a dividing wall 232 perpendicular to the former and the latter forms an upper and lower passages 234 and 236;
- in hollow zone 204 an enclosure 238 is formed by: a) portions of bottom wall 206 and first lateral wall 210, respectively, and b) a first interconnecting wall 240, which is coplanar with one of the several separating, equally spaced walls 216 that is proximate to first lateral wall 210, c) a second interconnecting wall 242 coplanar with the pair of top walls 208 and d) a spacing wall 243 coplanar with dividing wall 232;
- a pair of first openings (not shown) provided in each back wall 214 communicate with upper and lower passages 234 and 236;
- a pair of second openings 244 communicating-with said pair of first openings is provided in first lateral wall 210 in an area situated between the pair of back walls 214 and corresponding to hollow zone 204; an inlet and outlet fittings 246 and 248 are affixed to the pair of second openings 244, perpendicular to first lateral wall 210;
- a front stop wall 250 is used in each outwardly open compartment 202, for closing ends of upper and lower passages 234 and 236, which are disposed opposite to enclosure 238;
- each of the several separating, equally spaced walls 216 that form partitions 218 for rechargeable batteries 222 is provided longitudinally, at each lateral side, with a notch 252;
- each rechargeable battery 222 has, longitudinally, on each lateral face, a ridge 254 adaptable to be inserted into an adjacent notch 252;
- generally, the sizes of partitions 218 and rechargeable batteries 222 are so chosen that a light-press fit is obtained when the latter are inserted into the former; and
- various mechanical fixtures for securing rechargeable batteries 222 in outwardly open compartments 202 can be easily developed by a person skilled in the art.

Figure 8:
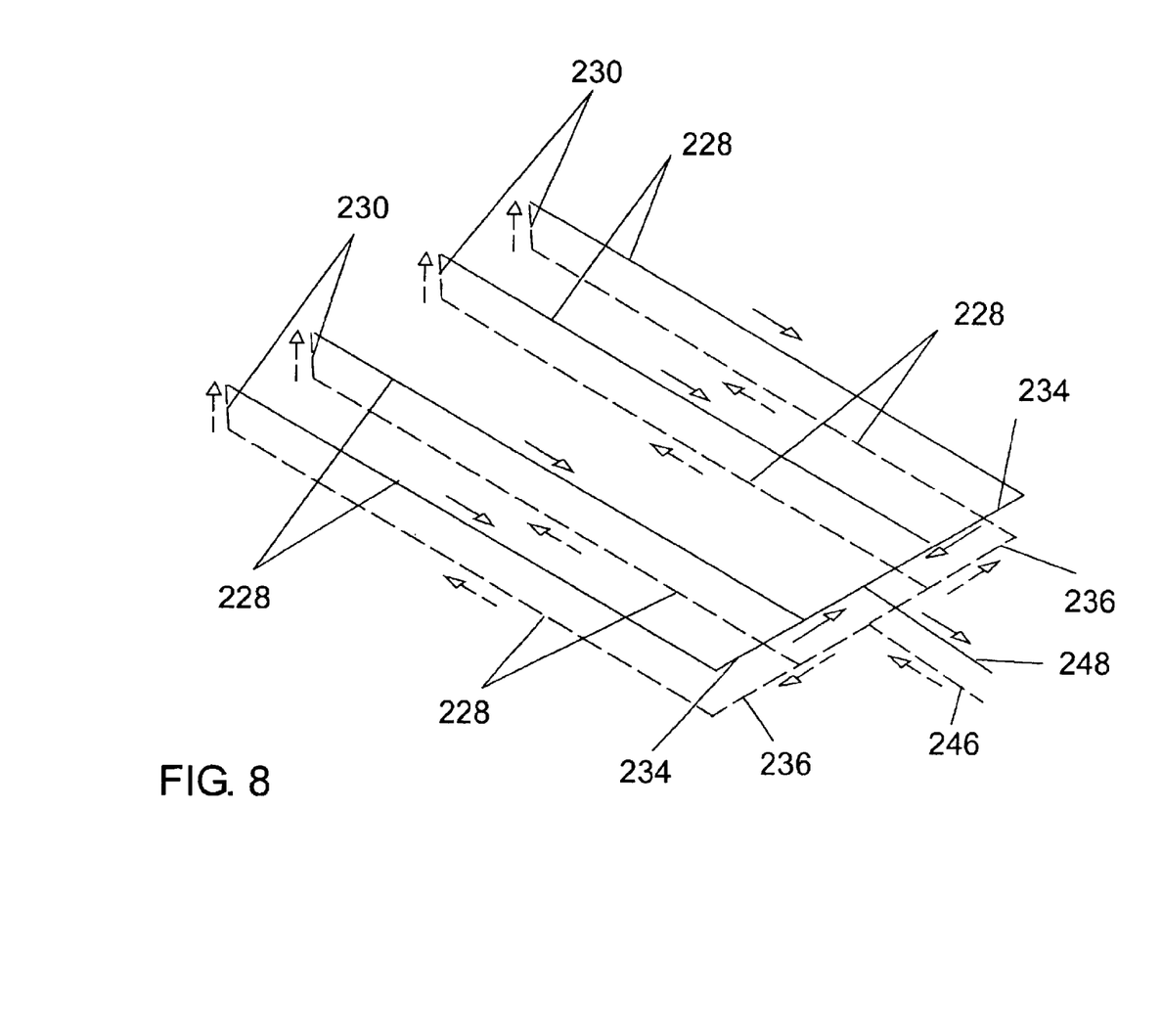
FIG. 8 a diagrammatic view of the flow of hot/warm air in the batteries housing.

A diagrammatic view of a flow of hot/warm air in batteries housing 200 shown in FIG. 8 is self-explanatory.

Figure 9:
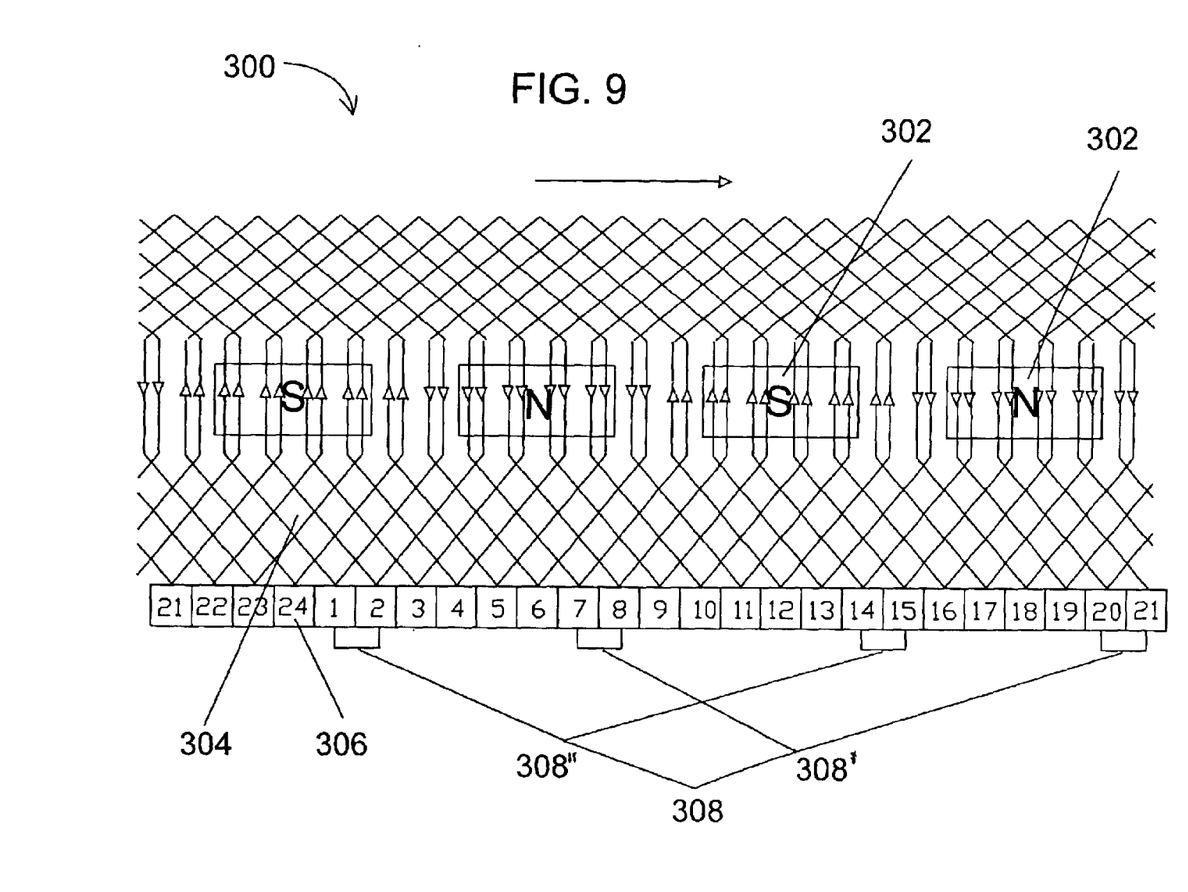
FIG. 9 is a diagrammatic view of a DC magnetic motor, according to the present invention, illustrated as unfolded to lie flatly all its length.

As shown in FIG. 9, DC magnetic motor 300 incorporates several alternating, equally spaced, permanent magnets 302 forming a pair of parallel, concentric discs (not shown). A central armature 304 is positioned between the latter. Central armature 304 serves as a rotor and, in the present embodiment, has a disc form with two-loop windings and twenty-four commuter segments 306 (see FIG. 9). These commuter segments 306 are divided as follows: commuter segments 306 having odd ordinal numbers form first loop windings, while commuter segments 306 having even ordinal numbers form second loop windings. Several alternating, equally spaced permanent magnets 302 serve as a stator.

Several brushes 308 are disposed in a conventional brush holder that is concentrically affixed to central armature 304. Half of the several brushes 308' are used for starting DC magnetic motor 300, while the other half 308"—for regular functioning.

Figure 10:
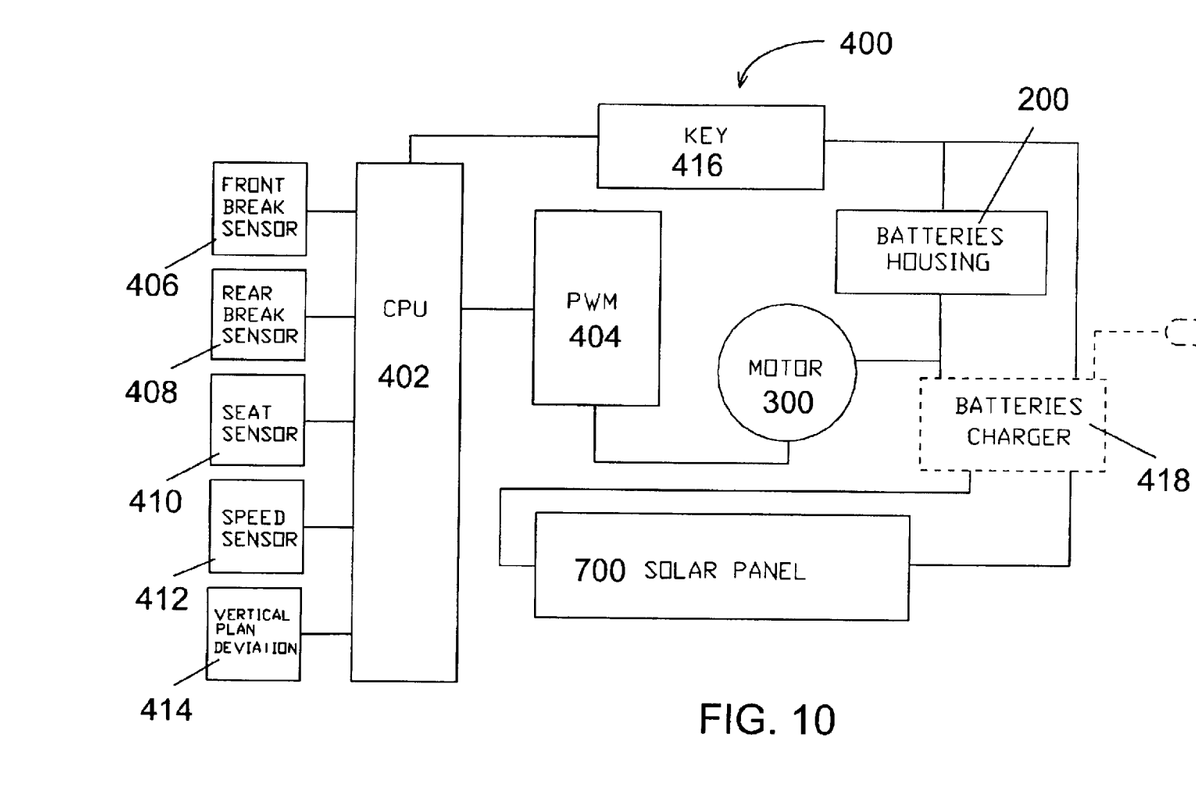
FIG. 10 is a controller assembly connected to other components of the electrical power unit for two-wheel vehicles.

Controller assembly 400 includes a Central Processing Unit (CPU) 402 and a Pulse Width Modulator Motor Speed Controller (PWM) 404. The latter is used for starting, stopping and regulating the speed of DC magnetic motor 300. Pulse Width Modulator Motor Speed Controller (PWM) 404 is sold by Curtis under the trade names CT 5211 & CT 5212. Central Processing Unit (CPU) 402 is of conventional type. In the present embodiment, the latter is connected to the following sensors that use commercially available software:

front brake sensor 406;

rear brake sensor 408;

seat sensor 410;

speed sensor 412;

and vertical plan deviation 414.

A key 416 for activating controller assembly 400 is provided. Conveniently, the latter can use solar panels 700 or a batteries charger 418. Alternatively, one can envisage the replacement of discharged batteries with pre-charged batteries.

While the electric power unit for two-wheel vehicles herein described constitutes a preferred embodiment of the invention, is to be understood that the invention is not limited to this precise structural description, and changes may be made therein without departing from the scope and spirit of the invention as defined in the appended claims.

The embodiments of the invention in which an exclusive property or privilege is claimed are defined as follows:

1. Electric power unit for two-wheel vehicles comprising a batteries housing from which current is supplied to a DC magnetic motor that is connected to a controller assembly, and a chain transmission driven by said DC magnetic motor being adapted to actuate a driven wheel of a two-wheel vehicle that has a frame to which said electrical power unit for two-wheel vehicles is attached, said batteries housing comprising a structure having means for forming two outwardly open compartments between which a hollow zone is interposed, each of said two outwardly open compartments being divided in several partitions, each of said several partitions being adaptable to receive one of several rechargeable batteries, said several rechargeable batteries having terminals for contacting a wiring; each of said two outwardly open compartments being provided with means for channeling air for heating said several rechargeable batteries, said means for channeling air for heating said several rechargeable batteries being located in said two outwardly open compartments, in and adjacent walls, as follows: a) in a top and bottom walls and in a pair of second lateral walls, and open towards said several partitions, and b) adjacent a first lateral wall, for forming upper and lower passages;

said DC magnetic motor with speed control comprising, in combination, a stator including several alternating, equally spaced, permanent magnets;

a rotor including a central armature in a disc form, with two-loop windings and an even number of commuter segments, said commuter segments having odd ordinal numbers forming first loop windings, while said commuter segments having even ordinal numbers forming second loop windings; and several brushes, disposed in a conventional holder that is concentrically affixed to said rotor, half of said several brushes being used for starting said DC magnetic motor, while another half being used for regular functioning; and said controller assembly including a Central Processing Unit; and means for starting, stopping and regulating a speed of said DC magnetic motor, said Central Processing Unit being connected to several sensors adaptable to be positioned to different parts of a two-wheel vehicle in order to detect various conditions and performances of the latter.

2. Electric power unit, as defined in claim 1, wherein said means for starting, stopping and regulating a speed of said DC magnetic motor is a Pulse Width Modulator Motor Speed Controller.

* * * * *